(12) United States Patent
Guldenfels et al.

(10) Patent No.: US 6,948,613 B2
(45) Date of Patent: Sep. 27, 2005

(54) MODULE WITH HIGH FRICTION CONVEYING SURFACE

(75) Inventors: Dieter Guldenfels, Pfeffingen (CH); Renato Gallon, Vittorio Veneto (IT)

(73) Assignee: Habasit AG, Reinach (CH)

( * ) Notice: Subject to any disclaimer, the term of this patent is extended or adjusted under 35 U.S.C. 154(b) by 136 days.

(21) Appl. No.: 10/683,177

(22) Filed: Oct. 10, 2003

(65) Prior Publication Data
US 2004/0112720 A1 Jun. 17, 2004

Related U.S. Application Data
(60) Provisional application No. 60/418,088, filed on Oct. 11, 2002.

(51) Int. Cl.[7] .............................................. B65G 17/06
(52) U.S. Cl. ................................... 198/853; 198/688.1
(58) Field of Search ............................. 198/850–853, 198/688.1

(56) References Cited

U.S. PATENT DOCUMENTS

| | | | |
|---|---|---|---|
| 1,414,212 A | 4/1922 | Samuelson | |
| 2,784,835 A | 3/1957 | Dixon | |
| 2,909,271 A | 10/1959 | Taylor | |
| 3,661,245 A | 5/1972 | Mol et al. | |
| 3,756,382 A | 9/1973 | Adey, Jr. et al. | |
| 3,785,476 A | 1/1974 | Poerink | |
| 3,857,478 A | 12/1974 | Meeusen | |
| 4,167,999 A | 9/1979 | Haggerty | |
| 4,351,429 A | 9/1982 | Garvey | |
| 4,438,838 A | 3/1984 | Hodlewsky et al. | |
| D290,932 S | 7/1987 | Abbestam et al. | |
| 4,711,346 A | 12/1987 | Breher et al. | |
| 4,754,872 A | 7/1988 | Damkjaer | |
| 4,832,183 A | 5/1989 | Lapeyre | |
| 4,855,174 A | 8/1989 | Kawamoto | |
| 4,880,107 A | 11/1989 | Deal | |
| D307,707 S | 5/1990 | Abbestam et al. | |
| 4,925,013 A | 5/1990 | Lapeyre | |
| 5,323,893 A | 6/1994 | Garbagnati | |
| 5,361,893 A | * 11/1994 | Lapeyre et al. ............. | 198/853 |
| 5,377,819 A | 1/1995 | Horton et al. | |
| 5,433,313 A | 7/1995 | Deschner | |
| 5,439,097 A | * 8/1995 | Takahashi et al. ...... | 198/867.01 |
| 5,497,874 A | 3/1996 | Layne | |
| 5,587,218 A | 12/1996 | Betz | |
| 6,068,112 A | 5/2000 | Kasai et al. | |
| 6,148,990 A | 11/2000 | Lapeyre et al. | |
| 6,209,714 B1 | 4/2001 | Lapeyre et al. | |
| 6,367,616 B1 | 4/2002 | Lapeyre et al. | |
| 6,471,048 B1 | 10/2002 | Thompson, Jr. et al. | |
| 2001/0045346 A1 | 11/2001 | Costanzo | |
| 2001/0052451 A1 | 12/2001 | Ruoss et al. | |
| 2002/0020609 A1 | 2/2002 | Lapeyre et al. | |

FOREIGN PATENT DOCUMENTS

| | | |
|---|---|---|
| DE | 100 27 229 A1 | 12/2001 |
| EP | 0 175 483 | 6/1989 |
| JP | 172534 | 7/1995 |
| WO | WO 98/14396 | 4/1998 |

* cited by examiner

*Primary Examiner*—Eileen D. Lillis
*Assistant Examiner*—Mark A. Deuble
(74) *Attorney, Agent, or Firm*—Hodgson Russ LLP

(57) ABSTRACT

A belt module having a peripheral frame and a network of channels or holes disposed in an upper surface for attaching a high friction material.

21 Claims, 4 Drawing Sheets

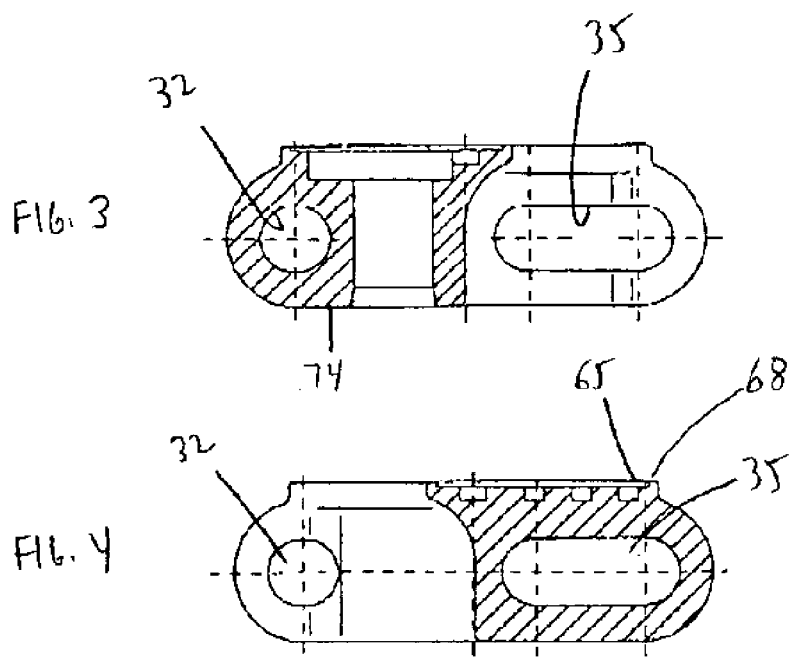
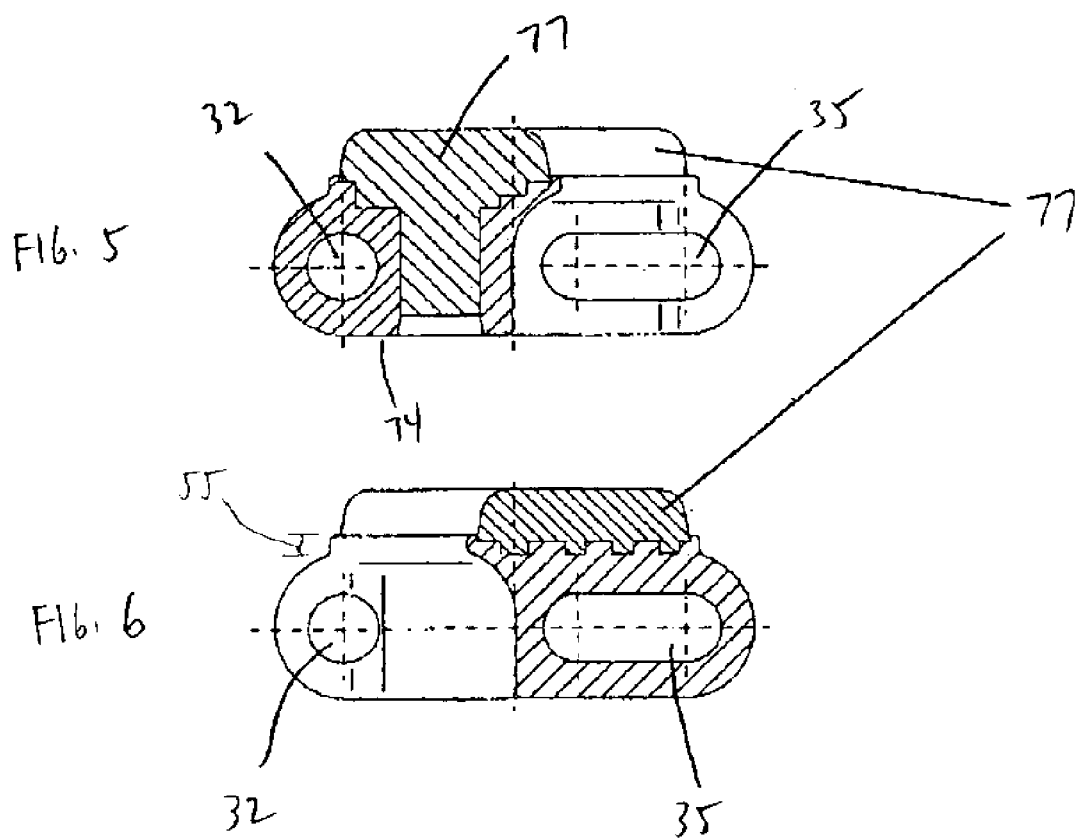

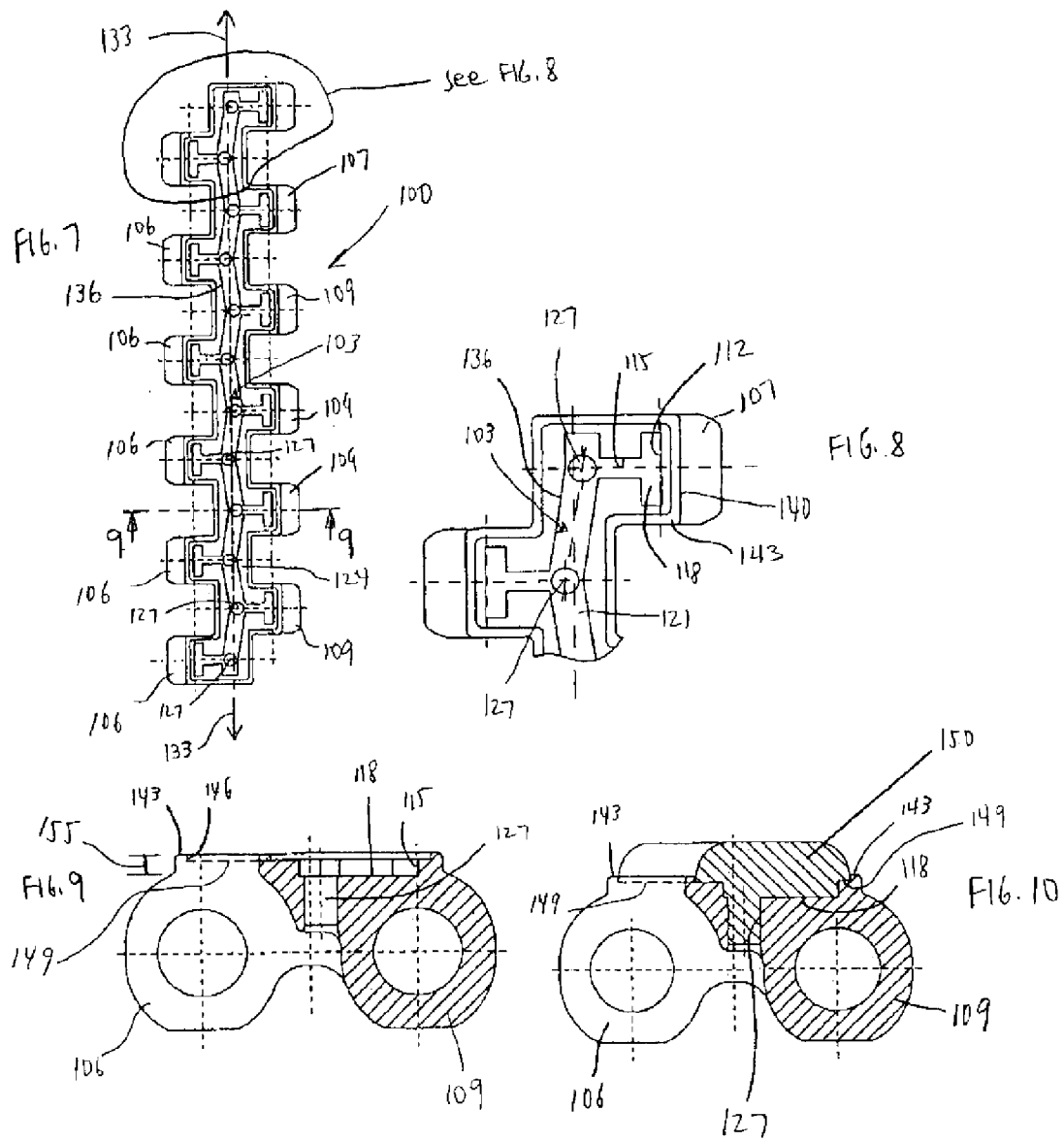

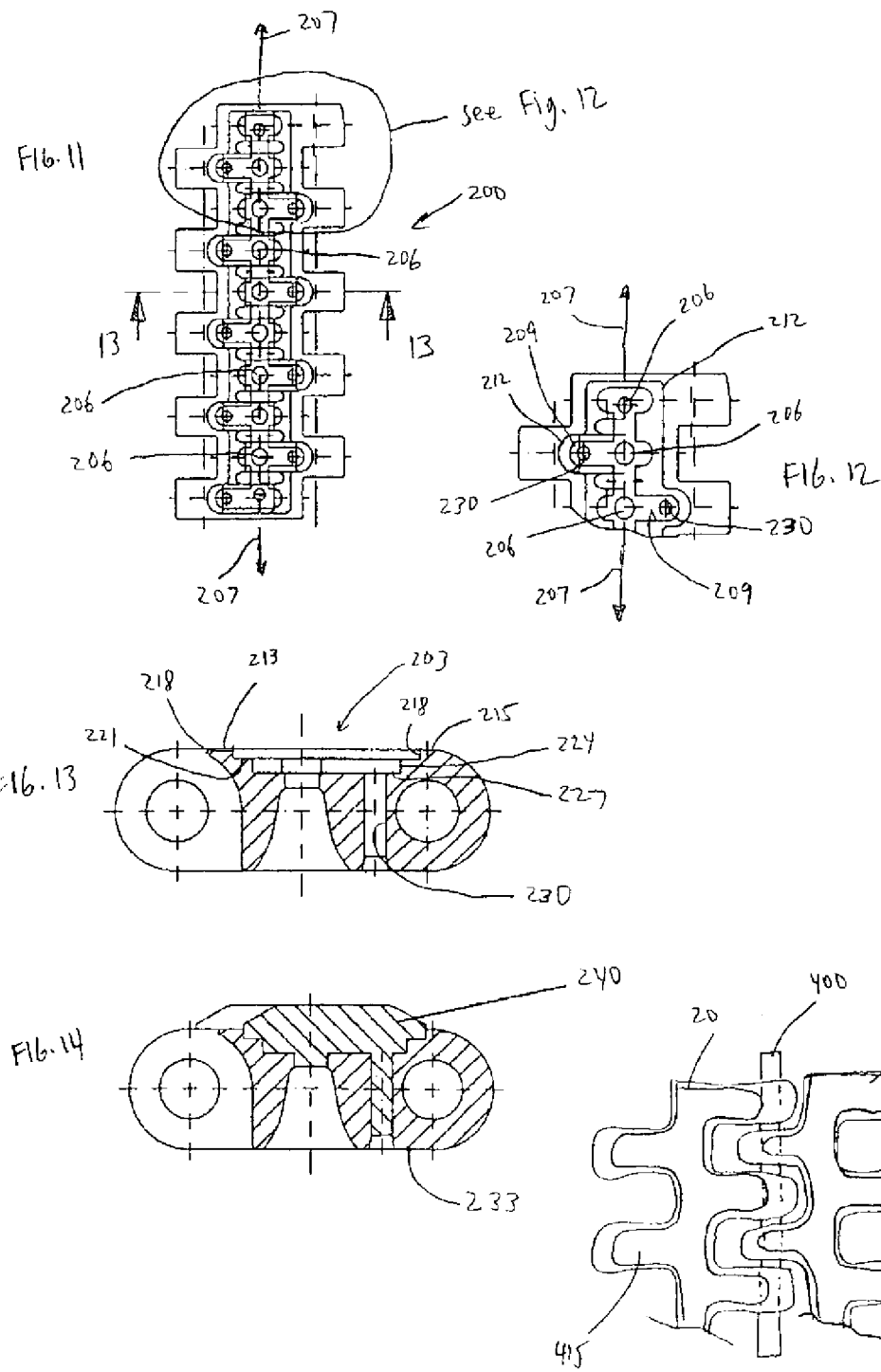

MODULE WITH HIGH FRICTION CONVEYING SURFACE

CROSS-REFERENCE TO RELATED APPLICATION

This application claims priority based on U.S. Provisional Patent Application No. 60/418,088 entitled "Module with High Friction Conveying Surface" filed on Oct. 11, 2002, which is incorporated herein by reference.

FIELD OF INVENTION

This invention relates to conveyor belts and, more particularly, to modular plastic conveyor belts formed of rows of plastic belt modules pivotally interlinked by transverse pivot rods.

BACKGROUND OF THE INVENTION

Because they do not corrode, are light weight, and are easy to clean, unlike metal conveyor belts, plastic conveyor belts are used widely, especially in conveying food products. Modular plastic conveyor belts are made up of molded plastic modular links, or belt-modules, that can be arranged side by side in rows of selectable width. A series of spaced apart link ends extending from each side of the modules include aligned apertures to accommodate a pivot rod. The link ends along one end of a row of modules are interconnected with the link ends of an adjacent row. A pivot rod journaled in the aligned apertures of the side-by-side and end-to-end connected modules forms a hinge between adjacent rows. Rows of belt modules are connected together to form an endless conveyor belt capable of articulating about a drive sprocket.

The belts may be straight running or in many industrial applications, conveyor belts are used to carry products along paths including curved segments. Belts capable of flexing sidewise to follow curved paths are referred to as sideflexing, turn, or radius belts. As a radius belt negotiates a turn, the belt must be able to fan out because the edge of the belt at the outside of the turn follows a longer path than the edge at the inside of the turn. In order to fan out, a modular plastic radius belt typically has provisions that allow it to collapse at the inside of a turn or to spread out at the outside of the turn.

Apertures slotted in the direction of travel of the belt are commonly provided in the link ends on at least one side of the modules to facilitate the collapsing and spreading of the belt.

In order to provide for conveying of objects up and down inclines without slippage, it has been known to provide the top surface of the belt modules with a high friction surface. There have been many attempts at attaching the high friction conveying surface, which is typically an elastomeric or other high friction material, to the top of the belt module, which is typically formed from a rigid plastic suitable for use in a modular belt.

As proposed in U.S. Pat. No. 5,361,893 and U.S. Pat. No. 5,507,383, the rubber is molded to the flat top surface of the module relying on the thermal bonding between the rubber and the plastic surface. In practice, this bonding does not provide sufficient strength, particularly if the bonding area is relatively small, as is the case for flush grid and radius belts. Further, the thermal bonding requires a suitable chemical formulation for the rubber compound and restricts the number of usable material combinations.

Accordingly, what is needed is an improved structure and method for attaching a high friction conveying surface to the top of a belt.

SUMMARY OF THE INVENTION

The present invention meets the above-described need by providing an improved structure and method for attaching a high friction surface to a belt module.

BRIEF DESCRIPTION OF THE DRAWINGS

The invention is illustrated in the drawings in which like reference characters designate the same or similar parts throughout the figures of which:

FIG. 3 is a cross-sectional view taken along lines 3—3 of FIG. 1;

FIG. 4 is a cross-sectional view taken along lines 4—4 of FIG. 1;

FIG. 5 is a cross-sectional view of the portion of the belt module shown in FIG. 3 with a high friction material retained in the grooves of the belt module;

FIG. 6 is a cross-sectional view of the portion of the belt module shown in FIG. 4 with a high friction material retained in the grooves of the belt module;

FIG. 7 is a top plan view of an alternate embodiment of the present invention;

FIG. 8 is an enlarged top plan view of a portion of the belt module shown in FIG. 7;

FIG. 9 is a cross-sectional view taken along lines 9—9 of FIG. 7;

FIG. 10 is a cross-sectional view of the portion of the belt module shown in FIG. 9 with a high friction material retained in the grooves of the belt module;

FIG. 11 is a top plan view of another alternate embodiment of the present invention;

FIG. 12 is an enlarged top plan view of a portion of the module shown in FIG. 11;

FIG. 13 is a cross-sectional view taken along lines 13—13 of FIG. 11;

FIG. 14 is a cross-sectional view of the portion of the belt module shown in FIG. 13 with a high friction material retained in the grooves of the belt module; and, FIG. 15 is a top plan view of a modular belt of the present invention.

DETAILED DESCRIPTION

Figure 1:
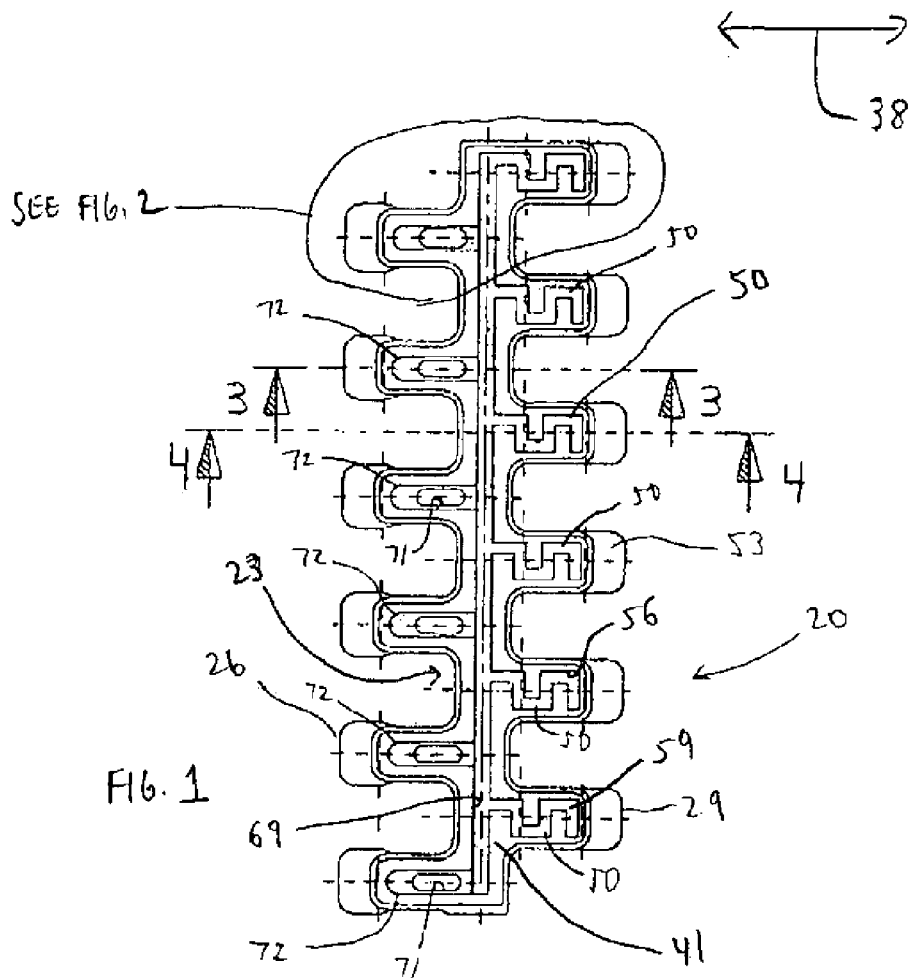
FIG. 1 is a top plan view of a belt module of the present invention prior to the application of the high friction conveying surface.
Figure 2:
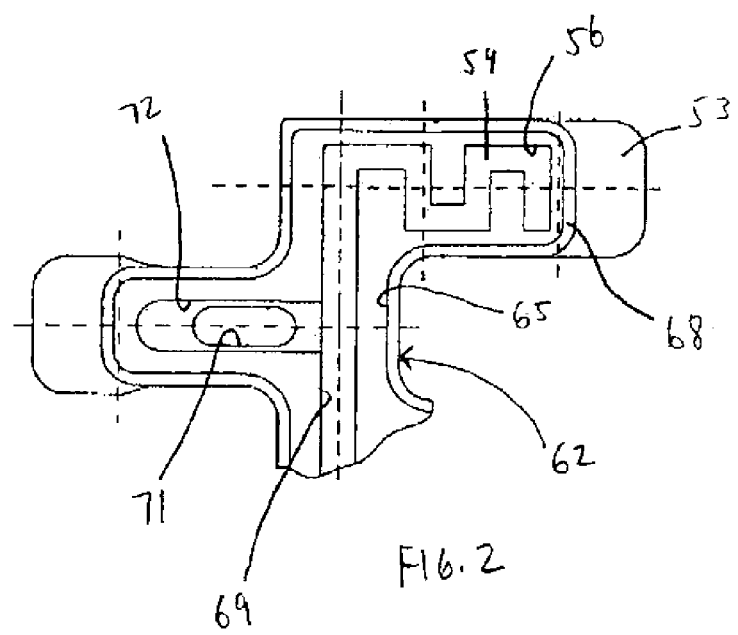
FIG. 2 is an enlarged top plan view of a portion of the module shown in FIG. 1.

Referring initially to FIGS. 1–4, a belt module 20 of the present invention is shown. For clarity, the module 20 is shown in these figures prior to application of a high friction material on the top, surface. FIGS. 5 and 6 show the module 20 with the high friction material disposed thereon as described below.

As will be evident to those of ordinary skill in the art, the belt module 20 is articulated with like modules by means of pivot rods 400 (FIG. 15) to form a modular belt 410 (FIG. 15) having a high friction material 415 (FIG. 15) on the top surface of each module. The belt module 20 has a body 23 with a first and second series of link ends 26, 29 that project from two opposite sides of the module body 23. Each link end 26, 29 includes an opening 32, 35 (FIGS. 3–6) that is disposed transverse to the direction of belt travel indicated by arrow 38. The module 20 may be driven in either direction by a drive sprocket (not shown). The link ends 26, 29 extend from an intermediate section 41 that is also disposed transverse to the direction of belt travel. The openings between the link ends provide spaces for intercalating adjacent modules 20. The link ends 26 along one end of a row of modules are interconnected with the link ends 29 of an adjacent row of modules. A pivot rod 400 journaled in the aligned apertures of the side-by-side and end-to-end connected modules forms a hinge between adjacent rows.

As shown in FIG. 3, the module 20 is designed to be used in a curved segment of a conveying path. Modular belts capable of flexing sidewise to follow curved paths are referred to as side-flexing, turn, or radius belts. As a radius belt negotiates a turn, the belt must be able to fan out because the edge of the belt at the outside of the turn follows a longer path than the edge at the inside of the turn. In order to fan out, a modular plastic radius belt is typically designed to allow it to collapse at the inside of a turn or to spread out at the outside of the turn. Opening 35 is slotted in the direction of belt travel to facilitate collapsing and spreading of the modular belt. Due to the oblong shape of opening 35, the pivot rod can pivot inside the opening 35 such that the modular belt is capable of collapsing on one side while the other side fans out due to the pivoting of the rod and the nesting of the link ends and cooperating spaces in adjacent belt modules.

Returning to FIG. 1, the belt module 20 includes a plurality of serpentine channels 50 located in link ends 29 and each recessed into the module upper surface 53. The channels 50 may be approximately 1 mm deep. The serpentine channels 50 include spaced apart vertical side walls 56 extending to and meeting with a bottom wall 59. The bottom wall 59 is oriented in a horizontal plane, generally parallel to the upper surface 53 of the module 20. The channel side walls 56 are disposed normal or perpendicular to the channel bottom wall 59. The vertical channel side walls 56 do not form an overhang or under cut with the bottom wall 59 because they are not at an acute angle. The module 20 further includes a peripheral frame 62 surrounding the serpentine channels 50. The inner side wall 65 of the frame 62 is disposed in a vertical orientation, perpendicular to the upper module surface 53 intermediate the serpentine channels 50. An upper frame surface 68 is raised above the normal height of the upper surface of the module 20 by a distance 55 (FIG. 6) resulting from a discontinuity located where the curve of the link end meets the top of the module. Similar to the channel side walls 56, the frame side wall 65 does not form an overhang or under cut with the upper module surface 53.

The serpentine channels 50 are connected throughout the upper surface 53 of the module 20 by a network of channels including a central channel 69 disposed along the intermediate section 41 and a plurality of channels 72 disposed in link ends 26.

Cylindrical or oval holes 71 connect the channels 72 with the bottom side 74 (FIG. 3) of the module 20. These holes 71 mainly allow the gas to escape during the molding process. In addition they improve the retention of the high friction material.

In FIGS. 5–6, a soft elastomeric, rubber, or other high friction material 77 is retained in the serpentine channels 50, mechanically anchored in place by the relatively large surface to surface area contact between the channel walls and the high friction material. The frame side wall 65 also helps secure the high friction material 77 to the module 20 by additional surface to surface area contact. The frame side wall 65 also protects the outer edge of the high friction material 77 against the impact of the transported goods which tend to peel off the rubber, or other high friction material from the plastic surface and penetrate between the rubber and the plastic.

The mechanical retention of the molded elastomeric material is assisted by the large contact surface on the vertical walls 56 of the channels 50.

As shown in FIG. 5, the high friction material 77 extends through a portion of the opening 71 but does not extend to the bottom surface 74 of the module.

Turning to FIG. 7, a module 100 for a flat top straight running belt is shown. A network of channels 103 is disposed throughout the top surface of the module 100. The link ends 106 and 109 contain T-shaped channels 112. The channels includes side walls 115 and a bottom wall 118. A central channel 121 is disposed through an intermediate section 124 of the module 100. A plurality of openings 127 connect the bottom wall of the central channel 121 to the bottom surface 130 of the module 100. With respect to a longitudinal axis 133 disposed through the intermediate section 124, the openings 127 are offset from the axis 133 in alternating fashion. Straight channel sections 136 connecting the openings 127 are disposed at an angle to the axis 133 in alternating fashion. Turning to FIGS. 8 and 9, the module 100 also includes an outer frame 140 having an upper frame surface 143 disposed above the upper surface 107 of the module 100. The frame 140 also has side walls 146 and a bottom wall 149 surrounding the channels.

In FIG. 10, the module 100 is shown with the high friction material 150 disposed in the channels and disposed through a portion of the opening 127.

While the embodiments shown in FIGS. 1–10 include serpentine and T-shaped arrangements for the channels, other geometries that provide a large contact surface on vertical walls disposed in the upper surface of the module would also be suitable. For example, an alternative embodiment is to use a large number of holes distributed over the upper surface of the module. The holes would have vertical side walls, and would be provided either in conjunction with the serpentine or T-shaped channels or instead of them.

In FIG. 11, another embodiment of the present invention is shown. The module 200 combines channels and holes for retention of the high friction material as described above. The belt module 200 is designed for a straight-running, flat top modular belt having a wide planar deck 203. For clarity, the module 200 is shown in FIGS. 11–13 prior to the addition of the high friction material. The module 200 includes a plurality of holes 206 disposed along a longitudinal axis 207. The holes 206 do not extend all the way through the module 200 and are used to provide additional surface area for contact between the high friction material and the module 200. The module 200 also includes channels 209 and an outer frame 212. As best shown in FIG. 13, the upper surface 213 of the frame 212 is coterminous with the upper surface 215 of the module 200. The frame 212 has side walls 218 and a bottom wall 221. The channels 209 also have side walls 224 and a bottom wall 227. The module 200 also includes a plurality of openings 230 that extend from the bottom wall of the channel completely through the bottom surface 233 of the module 200.

In FIG. 14, the high friction material 240 is disposed in the module 200. The material 240 extends through a portion of the opening 230 but does not extend to the bottom surface 233.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention.

What is claimed is:

1. A belt module for use in an endless modular conveying belt capable of articulating about a sprocket in a direction of belt travel, the belt module comprising:
   an intermediate section;
   a first plurality of link ends extending outwardly from the intermediate section in a direction of belt travel;
   a second plurality of link ends extending in a direction opposite to the first plurality of link ends, the second link ends being offset from the first link ends such that adjacently positioned belt modules are capable of intercalating so that the first link ends of one belt module fit into spaces defined between the second plurality of link ends of an adjacent module;
   a peripheral frame disposed around at least a portion of the intermediate section, the first plurality of link ends and the second plurality of link ends, the peripheral frame having side walls and a bottom wall defining a first recessed portion;
   at least one channel disposed inside the peripheral frame, the channel having side walls and a bottom wall defining a second recessed portion, the channel having at least one opening defined therein, the opening extending from the bottom wall of the channel to the opposite side of the module; and,
   a high friction material disposed on the belt module inside the peripheral frame.

2. The belt module of claim 1, wherein the at least one channel has a portion that is serpentine.

3. The belt module of claim 2, wherein the serpentine channel is disposed on at least one of the first plurality of link ends.

4. The belt module of claim 2, wherein the serpentine channel is disposed on at least one of the second plurality of link ends.

5. The belt module of claim 2, wherein the serpentine channel is disposed on the intermediate section.

6. The belt module of claim 1, wherein the at least one channel has a portion that is T-shaped.

7. The belt module of claim 6, wherein the T-shaped channel is disposed on at least one of the first plurality of link ends.

8. The belt module of claim 6, wherein the T-shaped channel is disposed on at least one of the second plurality of link ends.

9. The belt module of claim 1, further comprising a plurality of holes defined in the bottom wall of the peripheral frame, the holes having side walls and a bottom wall.

10. The belt module of claim 1, wherein the side walls of the peripheral frame are substantially straight.

11. The belt module of claim 1, wherein the side walls of the channel are substantially straight.

12. The belt module of claim 1, wherein the high friction material is disposed in the at least one opening.

13. The belt module of claim 1, wherein the high friction material is mechanically bonded to the belt module.

14. The belt module of claim 1, wherein the high friction material comprises rubber.

15. The belt module of claim 1, wherein the high friction material comprises an elastomeric material.

16. A belt module for use in an endless modular conveying belt capable of articulating about a sprocket in a direction of belt travel, the belt module comprising:
   an intermediate section;
   a first plurality of link ends extending outwardly from the intermediate section in a direction of belt travel;
   a second plurality of link ends extending in a direction opposite to the first plurality of link ends, the second link ends being offset from the first link ends such that adjacently positioned belt modules are capable of intercalating so that the first link ends of one belt module fit into spaces defined between the second plurality of link ends of an adjacent module;
   a peripheral frame disposed around at least a portion of the intermediate section, the first plurality of link ends and the second plurality of link ends, the peripheral frame having side walls and a bottom wall defining a first recessed portion;
   a plurality of holes disposed inside the peripheral frame, the holes having sidewalls and a bottom wall defining a second recessed portion;
   at least one opening extending from the bottom wall of the peripheral frame to the opposite side of the module; and,
   a high friction material disposed on the belt module inside the peripheral frame.

17. The belt module of claim 16, wherein the high friction material is disposed in the at least one opening.

18. The belt module of claim 16, wherein the high friction material is mechanically bonded to the belt module.

19. The belt module of claim 16, wherein the high friction material comprises rubber.

20. The belt module of claim 16, wherein the high friction material comprises an elastomeric material.

21. A modular belt, comprising:
   a plurality of belt modules having an intermediate section, a first plurality of link ends extending outwardly from the intermediate section in a direction of belt travel and having first pivot rod openings disposed transverse to the direction of belt travel, a second plurality of link ends extending in a direction opposite to the first plurality of link ends and having second pivot rod openings disposed transverse to the direction of belt travel, the second link ends being offset from the first link ends such that adjacently positioned belt modules are capable of intercalating so that the first link ends of one belt module fit into spaces defined between the second plurality of link ends of an adjacent module, a peripheral frame disposed around at least a portion of the intermediate section, the first plurality of link ends and the second plurality of link ends, the peripheral frame having side walls and a bottom wall defining a first recessed portion, at least one channel disposed inside the peripheral frame, the channel having side walls and a bottom wall defining a second recess portion, the channel having at least one opening defined therein, the opening extending from the bottom wall of the channel to the opposite side of the module, and a high friction material disposed on the belt module inside the peripheral frame; and,
   a plurality of pivot rods disposed through the first and second pivot rod openings such that the belt modules are intercalated and the adjacent belt modules are interlinked into adjacent hinged rows.

* * * * *